(12) United States Patent
Wu et al.

(10) Patent No.: US 9,133,327 B2
(45) Date of Patent: *Sep. 15, 2015

(54) COMPOSITIONS AND ARTICLES FORMED FROM THE SAME

(75) Inventors: Xiaosong Wu, Sugar Land, TX (US); Kim L. Walton, Lake Jackson, TX (US); Jeffrey C. Munro, Bellaire, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/344,272

(22) PCT Filed: Sep. 11, 2012

(86) PCT No.: PCT/US2012/054544
§ 371 (c)(1),
(2), (4) Date: Mar. 11, 2014

(87) PCT Pub. No.: WO2013/039850
PCT Pub. Date: Mar. 21, 2013

(65) Prior Publication Data
US 2014/0357799 A1    Dec. 4, 2014

Related U.S. Application Data

(60) Provisional application No. 61/533,285, filed on Sep. 12, 2011.

(51) Int. Cl.
| | | |
|---|---|---|
| *C08L 23/04* | (2006.01) | |
| *C08L 23/10* | (2006.01) | |
| *C08L 23/26* | (2006.01) | |
| *C08L 23/08* | (2006.01) | |

(52) U.S. Cl.
CPC ............. *C08L 23/26* (2013.01); *C08L 23/0815* (2013.01); *C08L 23/10* (2013.01); *C08L 2205/025* (2013.01); *C08L 2312/00* (2013.01)

(58) Field of Classification Search
CPC ..... C08L 23/0815; C08L 23/10; C08L 23/26; C08L 2312/00; C08L 2205/025
USPC ................................. 525/191, 240
See application file for complete search history.

(56) References Cited

U.S. PATENT DOCUMENTS

| | | |
|---|---|---|
| 3,806,558 A | 4/1974 | Fischer |
| 4,130,535 A | 12/1978 | Coran et al. |
| 4,299,931 A | 11/1981 | Coran et al. |
| 4,311,628 A | 1/1982 | Abdou-Sabet et al. |
| 4,338,413 A | 7/1982 | Coran et al. |
| 4,948,840 A | 8/1990 | Berta |
| 5,272,236 A | 12/1993 | Lai et al. |
| 5,672,660 A | 9/1997 | Medsker et al. |
| 6,121,383 A | 9/2000 | Abdou-Sabet et al. |
| 6,147,160 A | 11/2000 | Wang et al. |
| 6,277,916 B1 | 8/2001 | Terbrueggen et al. |
| 6,476,132 B1 | 11/2002 | Abdou-Sabet et al. |
| 6,548,600 B2 | 4/2003 | Walton |
| 6,774,186 B2 | 8/2004 | Walton |
| 7,338,994 B2 | 3/2008 | Walton et al. |
| 7,906,586 B2 | 3/2011 | Weaver et al. |
| 2002/0151647 A1 | 10/2002 | Laughner et al. |
| 2006/0199910 A1 | 9/2006 | Walton et al. |
| 2007/0021564 A1 | 1/2007 | Ellul et al. |
| 2007/0037931 A1 | 2/2007 | Chung et al. |
| 2007/0167575 A1 | 7/2007 | Weaver et al. |
| 2012/0120417 A1* | 5/2012 | Lin ................................ 358/1.1 |

FOREIGN PATENT DOCUMENTS

| | | |
|---|---|---|
| EP | 0751182 | 1/1997 |
| WO | 2007136494 A2 | 11/2007 |
| WO | 2007136496 A2 | 11/2007 |
| WO | 2007136497 A2 | 11/2007 |
| WO | 2011002986 A1 | 1/2011 |
| WO | 2011002998 A1 | 1/2011 |

OTHER PUBLICATIONS

PCT/US2012/054544, Nov. 5, 2012 International Search Report and Written Opinion.
PCT/US2012/054544, Mar. 21, 2014, International Preliminary Report on Patentability.

* cited by examiner

*Primary Examiner* — Nathan M Nutter

(57) ABSTRACT

The invention provides a composition comprising at least the following: A) an ethylene/α-olefin interpolymer; B) an olefin-based polymer; and C) a crosslinking agent; and wherein the ethylene/α-olefin interpolymer of component A) has the following properties: i) has a density greater than, or equal to, 0.850 g/cc; ii) a molar ratio of "vinyl to total unsaturation" greater than, or equal to, 1/10; iii) an I 10/I2 ratio from 6.2 to 40.

15 Claims, No Drawings

COMPOSITIONS AND ARTICLES FORMED FROM THE SAME

REFERENCE TO RELATED APPLICATIONS

The present application claims the benefit of U.S. Provisional Application No. 61/533,285, filed on Sep. 12, 2011, and incorporated herein by reference.

BACKGROUND OF THE INVENTION

Thermoplastic vulcanizates (TPVs) are produced via dynamic vulcanization of non-miscible blends of a rubber and a thermoplastic, that is, the selective cross-linking of the rubber, while melt mixing with the thermoplastic. As a result, products are obtained which consist of cross-linked rubber particles dispersed in a thermoplastic matrix, which provides both the elasticity and melt processability of TPVs. Compare to their non-crosslinked TPE counterparts, TPVs have superior properties in terms of heat resistance, compression set, chemical resistance and tensile strength. The majority of commercial TPVs are based on blends of EPDM with polypropylene (PP), which are typically crosslinked using a phenol derivative.

Thermoplastic vulcanizates may advantageously be produced by employing a peroxide cure system. "Peroxide-cured EPDM/PP TPV" generally exhibit lower color and lower residues than phenolic-cured TPV products, while maintaining good thermal stability and good compression set. U.S. Pat. No. 3,806,558 discloses that ethylene propylene-diene terpolymers (EPDM) can be partially cured by dynamic vulcanization, in the presence of polypropylene, to provide reprocessable materials with good physical properties. The diene component in polymer chains improves the crosslinking efficiency, but results in poor environmental degradation resistance. Alternatively, an ethylene-alpha olefin copolymer without a diene group can be used as rubber phase in peroxide cured TPV. Reference JP 3359505 discloses a thermoplastic polymer composition with improved environmental degradation by using an ethylene-octene copolymer produced by metallocene catalyst. However, metallocene-catalyzed ethylene-octene copolymer has a significant level of unsaturated groups that are not optimized for crosslinking applications.

It would be desirable for many of these applications to have new TPV formulations that have improved compression set and other mechanical properties.

International Publication No. WO 2011/002998 discloses ethylenic polymers comprising low levels of total unsaturation. Compositions using such ethylene polymers and fabricated articles made from the same are also disclosed.

International Publication No. WO 2011/002986 discloses ethylene polymers having low levels of long chain branching. Films and film layers, made from these polymers, and having good hot tack strength over a wide range of temperatures, are also disclosed.

International Publication No. WO 2007/136497 discloses a catalyst composition comprising one or more metal complexes of a multifunctional Lewis base ligand, comprising a bulky, planar, aromatic- or substituted aromatic-group; and polymerization processes employing the same, especially continuous, solution polymerization of one or more α-olefins at high catalyst efficiencies. See also WO 2007/136496 and WO 2007/136494.

U.S. Pat. No. 5,272,236 discloses substantially linear olefin polymers having a melt flow ratio (I10/I2)≥5.63, a molecular weight distribution defined by the equation: Mw/Mn≤(I10/I2)−4.63, and a critical shear stress at onset of gross melt fracture of greater than about $4 \times 10^6$ dyne/cm$^2$, and their method of manufacture. The substantially linear olefin polymers preferably have at least about "0.01 long chain branches/1000 carbons" and a molecular weight distribution from about 1.5 to about 2.5. The polymers have improved processability, and are useful in producing fabricated articles, such as fibers, films, and molded parts. See also U.S. Pat. No. 5,278,272.

JP3359505B2 discloses a thermoplastic polymer composition for resistance to environmental deterioration. The thermoplastic polymer composition comprises (A) 100 parts weight of an olefinic polymer, comprising ethylene and at least one kind of C3-C10 α-olefin (density of 0.85-0.91 g/cm$^3$ and Mw/Mn of <3.0), (B) 5-100 parts weight of a propylene polymer, (C) 5-250 parts weight of an oil, (D) 0.02-3 parts weight of a radical polymerization initiator, and (E) 0.1-5 parts weight of at least one crosslinking auxiliary, selected from divinyl benzene and triallyl isocyanurate. The composition can be obtained by heating and kneading the components, except the component C, to partially crosslink the mixture, and then subsequently adding the component C.

EP 0751182A1 discloses an olefin thermoplastic elastomer composition comprising 10 parts to less than 60 parts, by weight, of a crystalline polyolefin resin (A), and 90 parts to more than 40 parts, by weight, of an ethylene/α-olefin/non-conjugated polyene rubber (B). The rubber (B) is obtained by random copolymerization of ethylene, a C3-C20 α-olefin, and a nonconjugated polyene, in the presence of a metallocene catalyst.

U.S. Pat. No. 6,548,600 discloses rheology-modified thermoplastic elastomer compositions, comprising a melt blend of an ethylene/α-olefin polymer and a high melting polymer, such as polypropylene or a propylene/α-olefin copolymer. The rheology modification is induced by a combination of a peroxide and a free radical coagent. The resulting composition has an elastomeric phase, a non-elastomeric phase, and certain physical properties that exceed those of a like composition that is rheology-modified by peroxide alone. The compositions can be used to make a variety of articles of manufacture, such as automotive instrument panel skins, via calendaring and thermoforming procedures.

Additional polymer compositions are disclosed in the following references: U.S. Pat. Nos. 6,121,383, 6,147,160, 6,277,916, 6,476,132, 6,774,186, 4,130,535, 5,672,660, 4,948,840, 7,906,586, 7,338,994; US Publication Nos. 2002/0151647, 2007/0021564, 2007/0037931, 2006/0199910, 2002/0151647, 2007/0167575; and EP1940945B1.

There remains a need for TPV compositions with improved compression set and mechanical properties. There is also a need for such compositions that have reduced rubber particle size (and thus higher surface area and interface volume fraction) and increase the interfacial adhesion between the rubber phase and the plastic phase (all as indicated by improved mechanical properties). Compatibility and diffusion parameter of the rubber and thermoplastic affect interface thickness and interpolymer entanglements, and thus determine the size of the dispersed phase particle size and the mechanical and elastic properties. These needs and others have been met by the following invention.

SUMMARY OF THE INVENTION

The invention provides a composition comprising at least the following:
A) an ethylene/α-olefin interpolymer;
B) an olefin-based polymer; and
C) a crosslinking agent; and wherein the ethylene/α-olefin interpolymer of component A) has the following properties:
i) has a density greater than, or equal to, 0.850 g/cc;
ii) a molar ratio of "vinyl to total unsaturation" greater than, or equal to, 1/10;
iii) an I10/I2 ratio from 6.2 to 40.

DETAILED DESCRIPTION OF THE INVENTION

As discussed above, the invention provides a composition comprising at least the following:
A) an ethylene/α-olefin interpolymer;
B) an olefin-based polymer; and
C) a crosslinking agent; and
wherein the ethylene/α-olefin interpolymer of component A has the following properties:
i) has a density greater than, or equal to, 0.850 g/cc;
ii) a molar ratio of "vinyl to total unsaturation (R value)" greater than, or equal to, 1/10;
iii) an I10/I2 ratio from 6.2 to 40, or from 6.5 to 32.

In one embodiment, the ethylene/α-olefin interpolymer of component A) is an ethylene/α-olefin copolymer. In a further embodiment, the α-olefin is selected from C3-C10 α-olefins.

In one embodiment, the molar ratio of "vinyl to total unsaturation" is greater than, or equal to, 1/3 or greater than, or equal to, 2/5, or greater than, or equal to, 1/2, or greater than, or equal to, 3/5. In a further embodiment, the ethylene/α-olefin interpolymer of component A is an ethylene/α-olefin copolymer.

In one embodiment, the total unsaturation is less than, or equal to, 125 unsaturated bonds per 100,000 total carbon atoms. In a further embodiment, the ethylene/α-olefin interpolymer of component A is an ethylene/α-olefin copolymer.

In one embodiment, the ethylene/α-olefin interpolymer of component A has a "B value" of 1.0. In a further embodiment, the ethylene/α-olefin interpolymer of component A is an ethylene/α-olefin copolymer.

In one embodiment, the crosslinking agent of component C is selected from a peroxide crosslinking agent, an azide crosslinking agent, a polyorganosiloxane hydrosilylation crosslinking agent, or combinations thereof. In a further embodiment, the crosslinking agent is present in an amount from 0.5 to 6 PHR, or from 0.5 to 3 PHR (based on amount of component A).

In one embodiment, the crosslinking agent of component C is selected from a peroxide crosslinking agent, an azide crosslinking agent, or combinations thereof. In a further embodiment, the crosslinking agent is present in an amount from 0.5 to 6 PHR, or from 0.5 to 3 PHR (based on amount of component A).

In one embodiment, the composition further comprises a coagent.

In one embodiment, the coagent is selected from a trially cyanurate, a trially isocyanurate, or a trifunctional acrylate.

In one embodiment, the coagent is a trifunctional acrylate.

In one embodiment, the molar ratio of crosslinking agent to coagent is from 1 to 1/5 or from 1/2 to 1/5, or from 1/3 to 1/5.

In one embodiment, component A is present in an amount greater than, or equal to, 30 weight percent, or greater than, or equal to, 40 weight percent, or greater than, or equal to, 50 weight percent, based on the weight of Components A and B.

In one embodiment, component A is present in an amount from 20 to 80 weight percent, based on the sum weight of components A and B.

In one embodiment, component A is present in an amount from 55 to 80 weight percent, based on the sum weight of components A and B.

In one embodiment, component A is present in an amount from 60 to 75 weight percent, based on the sum weight of components A and B.

In one embodiment, component B is present in an amount from 20 to 80 weight percent, based on the sum weight of components A and B.

In one embodiment, component B is present in an amount from 20 to 45 weight percent, based on the sum weight of components A and B.

In one embodiment, component B is present in an amount from 25 to 40 weight percent, based on the sum weight of components A and B.

In one embodiment, Components A and B are present in an amount greater than 60, or greater than 70, or greater than 80 weight percent, or greater than 90 weight percent, based on the weight of the composition.

In one embodiment, Components A and B are present in an amount greater than 60, or greater than 70, or greater than 80 weight percent, or greater than 90 weight percent, based on the weight of the polymer components of the composition.

In one embodiment, the composition comprises less than 1 weight percent, further less than 0.5 weight percent, and further less than 0.1 weight percent, based on the weight of the composition, of a polyurethane.

In one embodiment, the composition does not contain a polyurethane.

In one embodiment, the composition comprises less than 1 weight percent, further less than 0.5 weight percent, and further less than 0.1 weight percent, based on the weight of the composition, of a polar polymer selected from polyurethanes, ethylene vinyl acetates, vinyl acetates, polyesters or polyamides.

In one embodiment, the composition does not contain a polar polymer selected from polyurethanes, ethylene vinyl acetates, vinyl acetates, polyesters or polyamides.

In one embodiment, the composition comprises less than 1 weight percent, further less than 0.5 weight percent, and further less than 0.1 weight percent, based on the weight of the composition, of a non-chlorinated ethylene-based polymer functionalized with maleic anhydride or maleic acid or derivatives thereof.

In one embodiment, the composition does not contain a non-chlorinated ethylene-based polymer functionalized with maleic anhydride or maleic acid or derivatives thereof.

In one embodiment, the composition comprises less than 1 weight percent, further less than 0.5 weight percent, and further less than 0.1 weight percent, based on the weight of the composition, of a non-chlorinated propylene-based polymer functionalized with maleic anhydride or maleic acids or derivatives thereof.

In one embodiment, the composition does not contain a non-chlorinated propylene-based polymer functionalized with maleic anhydride or maleic acids or derivatives thereof.

The invention also provides a crosslinked composition formed from an inventive composition.

In one embodiment, the crosslinked composition has a compression set, at 22 hr at 70° C., less than, or equal to, 50%.

In one embodiment, the crosslinked composition has a compression set, at 70 hr at 120° C., less than, or equal to, 67%, and further less than, or equal to, 65%.

In one embodiment, the crosslinked composition has a gel content greater than, or equal to, 40 wt %, or greater than, or equal to, 60 wt %, or greater than, or equal to, 80 wt %.

The invention also provides an article comprising at least one component formed from an invention composition. In a further embodiment, the article is a door profile, a window profile, a gasket, or a molded part.

An inventive composition may comprise a combination of two or more embodiments as described herein.

An inventive article may comprise a combination of two or more embodiments as described herein.

The ethylene/α-olefin interpolymer of component A may comprise a combination of two or more embodiments as described herein.

The olefin-based polymer of component B may comprise a combination of two or more embodiments as described herein.

The crosslinking agent of component C may comprise a combination of two or more embodiments as described herein.

Ethylene/α-Olefin Interpolymer (Component A)

In one embodiment, the ethylene-based polymer is an ethylene/α-olefin interpolymer, and preferably an ethylene/α-olefin copolymer.

In one embodiment, the ethylene/α-olefin interpolymer has a density greater than, or equal to, 0.850 g/cc, or greater than, or equal to, 0.855 g/cc, or greater than, or equal to, 0.860 g/cc (1 cc=1 cm$^3$). In a further embodiment, the ethylene/α-olefin interpolymer is an ethylene/α-olefin copolymer.

In one embodiment, the ethylene/α-olefin interpolymer has a density less than, or equal to, 0.920 g/cc, or less than, or equal to, 0.915 g/cc, or less than, or equal to, 0.910 g/cc, or less than, or equal to, 0.900 g/cc. In a further embodiment, the ethylene/α-olefin interpolymer is an ethylene/α-olefin copolymer.

In a further embodiment, the ethylene/α-olefin interpolymer has a density from 0.850 to 0.910 g/cc, or from 0.850 to 0.900 g/cc, or from 0.850 to 0.890 g/cc, or from 0.855 to 0.880 g/cc. In a further embodiment, the ethylene/α-olefin interpolymer of is an ethylene/α-olefin copolymer.

In one embodiment, the ethylene/α-olefin interpolymer has a melt index (I2) greater than, or equal to, 0.02 g/10 min, or greater than, or equal to, 0.05 g/10 min, or greater than, or equal to, 0.1 g/10 min. In a further embodiment, the ethylene/α-olefin interpolymer is an ethylene/α-olefin copolymer.

In one embodiment, the ethylene/α-olefin interpolymer has a melt index (I2) greater than, or equal to, 0.1 g/10 min, or greater than, or equal to, 0.2 g/10 min, or greater than, or equal to, 0.4 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 50 g/10 min, or less than, or equal to, 40 g/10 min, or less than, or equal to, 30 g/10 min, or less than, or equal to, 20 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 20 g/10 min, or less than, or equal to, 10 g/10 min, or less than, or equal to, 5 g/10 min, or less than, or equal to, 2 g/10 min. In a further embodiment, the ethylene/α-olefin interpolymer is an ethylene/α-olefin copolymer.

In one embodiment, the ethylene/α-olefin interpolymer has molecular weight distribution (Mw/Mn) greater than, or equal to, 1.2, or greater than, or equal to, 1.5, or greater than, or equal to, 2.0, as determined by GPC. In a further embodiment, the ethylene/α-olefin interpolymer is an ethylene/α-olefin copolymer.

In one embodiment, the ethylene/α-olefin interpolymer has molecular weight distribution (Mw/Mn) less than, or equal to, 3.5, or less than, or equal to, 3.0, or less than, or equal to, 2.8, as determined by GPC. In a further embodiment, the ethylene/α-olefin interpolymer is an ethylene/α-olefin copolymer.

Comonomers include, but are not limited to, propylene, isobutylene, 1-butene, 1-pentene, 1-hexene, 3-methyl-1-pentene, 4-methyl-1-pentene, and 1-octene, polyenes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one C3-C20 acyclic α-olefin, and preferably one C3-C10 acyclic α-olefin. Preferred comonomers include propene, 1-butene, 1-pentene, 1-hexene, 1-heptene and 1-octene, and more preferably include propene, 1-butene, 1-hexene and 1-octene.

Illustrative copolymers include ethylene/propylene (EP) copolymers, ethylene/butene (EB) copolymers, ethylene/hexene (EH) copolymers, ethylene/octene (EO) copolymers. Preferred copolymers include EP, EB, EH and EO polymers.

In one embodiment, the ethylene/α-olefin interpolymer has a melting point (Tm) greater than, or equal to, 20° C., or greater than, or equal to, 25° C. In a further embodiment, the ethylene/α-olefin interpolymer is an ethylene/α-olefin copolymer.

In one embodiment, the ethylene/α-olefin interpolymer has a melting point (Tm) less than, or equal to, 50° C., or less than, or equal to, 45° C. In a further embodiment, the ethylene/α-olefin interpolymer is an ethylene/α-olefin copolymer.

The ethylene/α-olefin interpolymer of component A is not "silane-grafted" and is not "MAH-grafted."

It has been discovered that certain ethylene/α-olefin interpolymers formed from certain metal complexes, such as the polyvalent aryloxyether compounds disclosed in WO2007136494, WO2007136496, WO2007136497, WO2011002986, and WO2011002998, can be used to form TPV compositions with excellent properties. These high molecular weight ethylene-α-olefin interpolymers have higher levels of unsaturated end group, and typically lower LCB. It is proposed that the higher levels of unsaturated end group facilitate the formation of a better network, by increasing the trapped entanglement density, and the lower LCB level in the interpolymer improve the diffusion at the rubber/thermoplastic interface, to provide a higher interface thickness in TPV compositions. Applicants have discovered that TPV compositions formed from such interpolymers have improved tensile strength, elongation, and compression set.

An ethylene/α-olefin interpolymer may comprise a combination of two or more embodiments as described herein.

An ethylene/α-olefin copolymer may comprise a combination of two or more embodiments as described herein.

Olefin-Based Polymer (Component B)

In one embodiment, the olefin-based polymer is an ethylene-based polymer or a propylene-based polymer.

In one embodiment, the olefin-based polymer is selected from the group consisting of the following: polypropylene homopolymers, propylene/ethylene copolymers, propylene/α-olefin copolymers, low density polyethylenes (LDPEs), high density polyethylenes (HDPEs), and a heterogeneously branched ethylene/α-olefin interpolymers and further copolymers. Heterogeneously branched ethylene-based interpolymers, and further copolymers, are typically prepared with a Ziegler/Natta catalyst system. These linear interpolymers and copolymers lack long chain branching, or measureable amounts of long chain branching. In a further embodiment, the α-olefin is selected from propylene, 1-butene, 1-hexene or 1-octene.

In one embodiment, the olefin-based polymer of Component B has a melting point (Tm) greater than 140° C., or greater than 150° C. In a further embodiment, the olefin-based polymer is a propylene-based polymer.

In one embodiment, the olefin-based polymer of Component B has a melting point (Tm) less than 165° C., or less than 160° C. In a further embodiment, the olefin-based polymer is a propylene-based polymer.

In one embodiment, the olefin-based polymer of Component B has a density greater than, or equal to, 0.855, or greater than, or equal to, 0.860, or greater than, or equal to, 0.870 g/cc (1 cc=1 cm$^3$). In a further embodiment, the olefin-based polymer is a propylene-based polymer.

In one embodiment, the olefin-based polymer of Component B has a density less than, or equal to, 0.915, or less than, or equal to, 0.910, or less than, or equal to, 0.905 g/cc (1 cc=1 cm$^3$). In a further embodiment, the olefin-based polymer is a propylene-based polymer.

In one embodiment, the olefin-based polymer is a propylene-based polymer.

In one embodiment, the propylene-based polymer is selected from polypropylene homopolymers, propylene/α-olefin interpolymers, or propylene/ethylene interpolymers.

In one embodiment, the propylene-based polymer of Component B has a melt flow rate (MFR) from 0.1 to 50, or from 0.1 to 20, or from 0.1 to 10, or from 0.1 to 5 g/10 min. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer of Component B has a melt flow rate (MFR) from 0.5 to 50, or from 0.5 to 20, or from 0.5 to 10, or from 0.5 to 5 g/10 min. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the polypropylene polymer has a heat of fusion (ΔHf), as determined by DSC, greater than, or equal to, 75 J/g, or greater than, or equal to, 80 J/g, greater than, or equal to, 85 J/g. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer has a melting point (Tm), as determined by DSC, greater than, or equal to, 140° C., or greater than, or equal to, 150° C., or greater than, or equal to, 155° C.

In one embodiment, the propylene-based polymer has a melting point (Tm), as determined by DSC, less than, or equal to, 170° C., or less than, or equal to, 165° C.

In one embodiment, the propylene-based polymer has a melting point from 140° C. to 165° C., or from 150° C. to 165° C., or from 155° C. to 165° C. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer has a molecular weight distribution Mw/Mn (MWD), greater than, or equal to, 2.5, or greater than, or equal to, 3.0, or greater than, or equal to, 4.0. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer has a molecular weight distribution Mw/Mn (MWD), less than, or equal to, 20, or less than, or equal to, 15, or less than, or equal to, 10. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer is a propylene/α-olefin copolymer. Some α-olefins useful in the propylene/α-olefin copolymers may be selected from the group of C4-C20 α-olefins. Examples of suitable α-olefins include, but are not limited to, 1-butene, 1-pentene, 1-hexene, 4-methyl-1-pentene, and 1-octene.

In one embodiment, the propylene-based polymer is a propylene/ethylene interpolymer, and preferably a copolymer. In a further embodiment, propylene/ethylene copolymer comprises less than, or equal to, 3 weight percent ethylene, based on the weight of the composition.

In one embodiment, the propylene-based polymer is a propylene homopolymer.

Examples of useful polypropylene homopolymer and propylene/ethylene copolymer include PP534-1 (available from ExxonMobil Corp.), PROFAX 6823 (available from LyondellBasell, Inc.), ARISTECH D008M (available from Aristech Corp), HF 136MO (available from Borealis AG), F008F (available from Sunoco, Inc.), and DOW H10-02N Polypropylene Resin.

A polypropylene homopolymer may comprise a combination of two or more embodiments as described herein.

A propylene/α-olefin interpolymer, or copolymer, may comprise a combination of two or more embodiments as described herein A propylene/ethylene interpolymer, or copolymer, may comprise a combination of two or more embodiments as described herein.

Crosslinking Agent (C)

Crosslinking agents include, but are not limited to, peroxide crosslinking agents, organic azides crosslinking agents, phenolic curing agents, sulfur-containing compounds, and combinations thereof.

In one embodiment, the crosslinking agent is selected from at least one peroxide crosslinking agent, at least one organic azide crosslinking agent, or a combination thereof.

Peroxides include, but are not limited to, as di-tertbutyl peroxide, tertbutylcumyl peroxide, dicumyl peroxide, 2,5-dimethyl-2,5-di-(tertbutylperoxy) hexane, di-(tertbutylperoxyisopropyl)benzene, tertbutyl peroxybenzoate, and 1,1-di-(tertbutylperoxy)-3,3,5-trimethylcyclohexane.

Organic azides crosslinking agent include, but are not limited to, as benzene-1,3-bis(sulfonyl)azide and cyclo-hexane-1,4-di(sulfonyl)-azide.

A crosslinking agent may comprise a combination of two or more embodiments as described herein.

In one embodiment, the inventive crosslinked composition can be pelletized.

Applications

The present invention also provides a process of making TPV composition comprising blending component B and cured component A by dynamic vulcanization.

The thermoplastic vulcanizates based on the invented composition are preferably prepared by utilizing dynamic vulcanization techniques. Dynamic vulcanization is a process whereby a blend of plastic, rubber and rubber curative is masticated, while curing the rubber. The term "dynamic" indicates the mixture is subjected to shear forces during the vulcanization step, as contrasted with "static" vulcanization, wherein the vulcanizable composition is immobile (in fixed relative space) during the vulcanization step. One advantage of dynamic vulcanization is that elastoplastic (thermoplastic elastomeric) compositions may be obtained when the crosslinked rubber is well dispersed in the thermoplastic matrix. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,049 4,287,324; 4,288,570; 4,299,931; 4,311,628 and 4,338,413; each reference is incorporated herein by reference.

A variety of mixing equipment can be employed to prepare TPV by dynamic vulcanization process. Illustrative mixing equipment include: batch mixers, such as BRABENDER mixers, BANBURY mixers, continuous mixers such as FARRELL continuous mixers, and extruders with one or more screws such as COPERION ZSK 53. One or more such mixing equipment, including extruders, can be used in series.

The thermoplastic, rubber and curatives can be added to a heated mixer as individual feed streams, as a dry blend, or as a masterbatch. When an extruder is used to prepare the TPV, if additional oil is needed, the oil is preferably added from a port provided in the melt mixing device using a gear pump or the like. Moreover, additional additives or materials, including other resins and elastomers, may be added by a side feeder on the melt mixing device or the like.

In one embodiment, the composition further comprises at least one additive. In a further embodiment, the additive is selected from antioxidants, stabilizers, pigments, fillers, or combinations thereof. In a further embodiment, the at least one additive is present in an amount from 0.1 to 5 weight percent, preferably from 0.1 to 1 weight percent, based on the weight of the composition.

In one embodiment, the composition further comprises a filler. In a further embodiment, the filler is selected from the group consisting of CaCO3, clay, talc, carbon black, and combinations thereof. In one embodiment, the filler is present in an amount from 1 to 50 weight percent, preferably 1 to 30 weight percent, based on the weight of the composition.

In one embodiment, the composition further comprises the following:

Component D: an extender oil, such as paraffin oil or other plasticizers;

Component E: a filler, such as silica or other fillers;

Component F: optionally, other processing aids or additives, such as antioxidants.

The invention provides for an article comprising at least one component formed from an inventive composition.

Articles include, but are not limited to, films, sheets, automotive parts, building and construction materials (for example, door profiles, window profiles, and roofing materials), computer components, belts, artificial leather, artificial turf, fabrics, laminates, or injection molded parts, footwear components, carpet components, ball bladders, inflation devices, swimming pool liners, air beds, toys, and furniture parts.

Articles can be formed by generally known methods, including, but not limited to, extrusion processes, injection molding, and compression molding.

DEFINITIONS

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises a majority amount of polymerized olefin monomer, for example, ethylene or propylene, (based on the weight of the polymer), and optionally may comprise one or more comonomers.

The term, "ethylene-based polymer," as used herein, refers to a polymer that comprises a majority amount of polymerized ethylene monomer (based on the weight of the polymer), and optionally may comprise one or more comonomers.

The term, "ethylene/α-olefin interpolymer," as used herein, refers to an interpolymer that comprises a majority amount of polymerized ethylene monomer (based on the weight of the interpolymer), and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term, "propylene-based polymer," as used herein, refers to a polymer that comprises a majority amount of polymerized propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

Test Methods

Density

Density is measured in accordance with ASTM D-792-08.

Melt Index

Melt index ($I_2$) for the ethylene-based polymers, in g/10 min, was measured using ASTM D-1238-10 (Condition 190° C./2.16 kg). The notation "I5" refers to a melt index, in g/10 min, measured using ASTM D-1238-10, Condition 190° C./5.0 kg. The notation "I10" refers to a melt index, in g/10 min, measured using ASTM D-1238-10, Condition 190° C./10.0 kg. The notation "I21" refers to a melt index, in g/10 min, measured using ASTM D-1238-10, Condition 190° C./21.6 kg. For propylene-based polymers, the melt flow rate (MFR) was measured using ASTM D-1238-10 (Condition 230° C./2.16 kg).

NMR Experimental

Sample Preparation

For 13C NMR, the sample was prepared by adding approximately "2.7 g of stock solvent" to "0.21 g sample," in a 10 mm NMR tube, and then purging the resulting solution in a nitrogen (N2) box for two hours. The stock solvent was made by dissolving "4 g of PDCB-d4" in "39.2 g of ODCB with 0.025M chromium acetylacetonate (relaxation agent)." The sample was dissolved, and homogenized, by heating the tube and its contents at 140-150° C.

For 1H NMR, the samples were prepared by adding "~130 mg of sample" to "3.25 g of 50/50 by weight Tetrachlorethane-d2/Perchloroethylene with 0.001 M Cr(AcAc)3" in a NORELL 1001-7, 10 mm NMR tube. The samples were purged by bubbling nitrogen (N2) through the solvent, via a pipette inserted into the tube, for approximately five minutes, to prevent oxidation. The samples were then capped, sealed with TEFLON tape, and then soaked at room temperature, overnight, to facilitate sample dissolution. The samples were kept in a N2 purge box during storage, before, and after preparation, to minimize exposure to oxygen. The samples were heated and vortexed at 115° C. to ensure homogeneity.

Data Acquisition Parameters

For 13C NMR, the data were collected using a BRUKER 400 MHz spectrometer, equipped with a BRUKER Dual DUL high-temperature CryoProbe. The data were acquired using "320 transients per data file," a "7.3 sec pulse repetition delay (6 sec delay+1.3 sec acq. time)," "90 degree flip angles," and inverse gated decoupling with a sample temperature of 120° C. All measurements were made on non spinning samples in locked mode. Samples were homogenized immediately prior to insertion into the heated (125° C.) NMR sample changer, and were allowed to thermally equilibrate in the probe for seven minutes, prior to data acquisition.

The 1H NMR was performed on a BRUKER AVANCE 400 MHz spectrometer, equipped with a BRUKER Dual DUL high-temperature CryoProbe, and a sample temperature of 120° C. Two experiments were run to obtain spectra, a control spectrum to quantify the total polymer protons, and a double presaturation experiment, to suppress the intense polymer backbone peaks, and to enable high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, lc1prf2.zz1, TD 32768, 100 scans, DS 4, SWH 10,000 Hz, AQ 1.64 s, D1 1 s, D13 13 s.

Gel Content

Gel content can be measured by a small scale Soxhlet extraction method. Samples are cut into small pieces, ranging from about 35 mg to 86 mg. Three pieces of each sample are individually weighed, to at least four digits, on a top-loading electronic analytical balance. Each piece is placed inside a small cylinder composed of aluminum window screen. The ends of the cylinders are closed with ordinary paper staples. Six aluminum cylinders are placed inside one fritted glass extraction thimble. The thimbles are placed in jacketed Soxhlet extractors, and extracted overnight with refluxing xylenes. At the end of the minimum 12 hour extraction, the still warm thimbles are quenched in methanol. The methanol precipitates the gel, to facilitate removal of the gels, intact from the cylinders. The cylinders containing precipitated gels are purged briefly with nitrogen to drive off free methanol. The gels are removed from the aluminum cylinders with forceps, and placed on aluminum weighing pans. The pans with gels are vacuum dried for one hour at 125° C. The dried, cool gels are removed from aluminum weighing pans, and weighed directly on the top-loading analytical balance. The dry extracted gel weight is divided by the starting weight to give the percent gel content.

Gel Permeation Chromatography (GPC)

Conventional GPC measurements were used to determine the weight-average (Mw) and number-average (Mn) molecular weight of the polymer, and to determine the MWD(=Mw/Mn). Samples were analyzed with a high-temperature GPC instrument (Polymer Laboratories, Inc. model PL220).

The method employs the well-known universal calibration method, based on the concept of hydrodynamic volume, and the calibration was performed using narrow polystyrene (PS) standards along with four mixed A, 20 μm columns (PLgel Mixed A from Agilent (formerly Polymer Laboratory Inc.)), operating at a system temperature of 140° C. Samples were prepared at a "2 mg/mL" concentration, in 1,2,4-trichlorobenzene solvent. The flow rate was 1.0 mL/min, and the injection size was 100 microliters.

The molecular weight determination was deduced by using narrow molecular weight distribution polystyrene standards (from Polymer Laboratories), in conjunction with their elution volumes. The equivalent polyethylene molecular weights were determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a * (M_{polystyrene})^b.$$

In this equation, a=0.4316 and b=1.0. Weight average molecular weight (Mw) and number average molecular weight (Mn) were calculated in the usual manners. For example, Mw was calculated according to the following formula: $Mw = \Sigma\ w_i M_i$, where $w_i$ and $M_i$ are the weight fraction and molecular weight, respectively, of the ith fraction eluting from the GPC column Polyethylene equivalent molecular weight calculations were performed using Viscotek TriSEC software Version 3.0.

Differential Scanning Calorimetry

Differential Scanning Calorimetry (DSC) can be used to measure melting temperature, crystallization temperature, and crystallinity of ethylene-based polymer (PE) samples and propylene-based polymer (PP) samples. About five to eight mg of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled, at a rate of 10° C./min, to −60° C. for PE (−40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE (165 J/g, for PP), and multiplying this quantity by 100 (for example, % cryst.=(Hf/292 J/g)×100 (for PE)).

Unless otherwise stated, melting point(s) (Tm) of each polymer sample is determined from the second heat curve, obtained from DSC, as described above. The crystallization temperature (Tc) is measured from the first cooling curve. The Tm is the temperature measured at the peak of the endotherm, as shown on the heating curve. The Tc is the temperature measured at the peak of the exotherm, as shown on the cooling curve.

The following examples illustrate the present invention, but are not intended to limit the scope of the invention.

EXAMPLES

Materials

Materials used in preparing the Inventive and Comparative Examples are listed in Table 1.

TABLE 1

Materials used in Examples Compositions

| Material | Description | Supplier |
|---|---|---|
| EO copolymers (EO-1, EO-2, EO-3, EO-4) | Ethylene octene copolymer | The Dow Chemical Company |
| EO 42* | Ethylene octene copolymer | The Dow Chemical Company |
| PP (H110-02N) | Polypropylene homopolymer, 2MFR, | The Dow Chemical Company |
| HYDROBRITE 550PO | Paraffinic process oil | Sunoco, Inc. |
| LUPEROX 101 XL-45 | Peroxide crosslink agent | Arkema Inc. |
| LUPEROXF40M-SP | Peroxide crosslink agent | Arkema Inc. |
| TAIC-TLC-72 | Coagent | Harwick Standard Dist Corp |
| IRGANOX B225 | Antioxidant | BASF |

*Prepared with a constrained geometry catalyst.

Representative Polymerization of an EO Copolymer:

All materials (ethylene, 1-octene) and the process solvent (a narrow boiling range high-purity isoparaffinic solvent trademarked ISOPAR E, and commercially available from Exxon Mobil Corporation) were purified with molecular sieves, before introduction into the reaction environment. Hydrogen was supplied in pressurized cylinders, as a high purity grade, and was not further purified. The reactor monomer feed (ethylene) stream was pressurized, via a mechanical compressor, to above a reaction pressure of 525 psig. The solvent and comonomer (1-octene) feed was pressurized, via a mechanical positive displacement pump, to above reaction pressure at 525 psig. The individual catalyst components were manually batch diluted to specified component concentrations with purified solvent (ISOPAR E), and pressured to above reaction pressure of 525 psig. All reaction feed flows were measured with mass flow meters, and independently controlled with computer automated control systems.

The polymerization took place via a continuous solution polymerization. The reactor consisted of a liquid full, non-adiabatic, isothermal, continuously stirred tank reactor (CSTR) with an agitator. The reactor had independent control of all fresh solvent, monomer, comonomer, hydrogen, and catalyst component feeds. The fresh monomer and comonomer feed control was used to alter the polymer density. The combined solvent, monomer, comonomer and hydrogen feed to the reactor was temperature controlled from 5° C. to 50° C., and typically 25° C., by passing the feed stream though a heat exchanger. The fresh comonomer feed to the polymerization reactor was fed in with the solvent feed. The total fresh feed to the polymerization reactor was injected into the reactor at the bottom of the CSTR. The catalyst component (zirconium,[2, 2'''-[1,3-propanediylbis(oxy-κO)bis[3'',5,5''-tris(1,1-dimethylethyl)-5'-methyl[1,1':3',1''-terphenyl]-2'-olato-κO]]dimethyl-,(OC-6-33)) was injected into the polymerization reactor through a specially designed injection stinger, and was injected at an angle at the bottom of the reactor. The primary catalyst component feed was computer controlled to maintain the reactor monomer concentration at a specified target. The two cocatalyst components (amines, bis(hydrogenated tallow alkyl)methyl, tetrakis(pentafluorophenyl)borate (1-) and modified methyl aluminoxane (MMAO)) were fed based on calculated molar ratios to the primary catalyst component. The cocatalyst components were also injected into the polymerization reactor through a designed injection stinger similar to the catalyst injection. The contents of the reactor were continuously circulated by a two-blade agitator.

The effluent from the first polymerization reactor (containing solvent, monomer, comonomer, hydrogen, catalyst components, and molten polymer) exited the CSTR, and was contacted with water to stop the reaction. In addition, various additives, such as antioxidants, were added at this point, in ppm amounts, as is custom in the industry. The stream was then transferred through a set of KENICS static mixing elements to evenly disperse the catalyst kill and additives.

Following the additive addition, the effluent (containing solvent, monomer, hydrogen, catalyst components, and molten polymer) passes through a heat exchanger to remove lower boiling reaction components. The polymer stream was next devolatilized to remove solvent, hydrogen, and unreacted monomer and comonomer, and the polymer melt was pumped through a die, cooled by water, and cut into uniform solid pellets. A summary of polymerization conditions are listed in Tables 2A and 2B.

TABLE 2A

Polymerization Conditions

| Polymer | MI (I2) | Density (g/cc) | Reactor Temp (° C.) | Reactor Pressure (psig) | Solvent/ C2 Ratio | C2 Conv. (%) | Corrected Exit C2 (g/L) | Reactor Polymer Conc. (wt %) | H2 mole % | Octene/Olefin wt. ratio* |
|---|---|---|---|---|---|---|---|---|---|---|
| EO-2 | 0.84 | 0.859 | 154 | 525 | 12.1 | 66.4 | 10.4 | 8.1 | 0.16 | 80.0% |
| EO-3 | 0.16 | 0.858 | 157 | 525 | 12.5 | 64.5 | 10.3 | 7.6 | 0.08 | 80.4% |
| EO-4 | 0.25 | 0.852 | 155 | 525 | 10.8 | 67.9 | 10.4 | 10.5 | 0.05 | 84.6% |

*The octene/olefin ratio, where olefin = octene + ethylene. This ratio refers to the feed concentration of the monomers to the reactor. It is a weight basis: "lbs octene/(lbs octene + lbs ethylene)," fed to the reactor.

TABLE 2B

Polymerization Conditions

| Run | Mol cat/ mol ethylene | Mol MMAO/ mol cat | Mol coCat*/ mol cat |
|---|---|---|---|
| EO-2 | $5.0 \times 10^{-8}$ | 9.7 | 1.2 |
| EO-3 | $5.4 \times 10^{-8}$ | 9.5 | 1.1 |
| EO-4 | $6.2 \times 10^{-8}$ | 9.9 | 1.3 |

*amines, bis(hydrogenated tallow alkyl)methyl, tetrakis(pentafluorophenyl)borate(1-)

A summary of properties of ethylene α-olefin copolymers used in example TPV compositions are listed in Table 3, and NMR characterizations are listed in Table 4.

Representative TPV Preparation:

The polymer (ethylene/octene copolymer) pellets were imbibed in paraffinic oil in a glass jar, at 50° C., for 24 hours, to minimize slippage and to reduce mixing time. The oil-imbibed polymer and the thermoplastic resin (Dow H110-

TABLE 3

Properties of Ethylene α-olefin Copolymers

| Sample | Density g/cc | Mw g/mole | Mn g/mole | Mw/Mn | Melt Flow Rate I2@ 190° C. g/10 min | Melt Flow Ratio I10/I2 [@190° C.] | Tm (° C.) |
|---|---|---|---|---|---|---|---|
| EO 42 | 0.857 | 120,910 | 53,320 | 2.27 | 1.0 | 8.7 | 38 |
| EO-1 | 0.856 | 111,380 | 53,700 | 2.07 | 1.1 | 8.2 | 38 |
| EO-2 | 0.858 | 125,500 | 59,100 | 2.12 | 0.8 | 6.8 | 44 |
| EO-3 | 0.858 | 179,290 | 77,830 | 2.30 | 0.2 | 10.2 | 42 |
| EO-4 | 0.852 | 203,480 | 83,750 | 2.43 | 0.2 | 31 | 27 |

TABLE 4

Unsaturation of the Ethylene/α-olefin Copolymers by H1 NMR

| Polymer | Vinylene | (+/−)* | Trisub-stituted | (+/−)* | vinyl | (+/−)* | Vinyli-dene | (+/−)* | Total | R(vinyl/Total unsaturation) |
|---|---|---|---|---|---|---|---|---|---|---|
| EO 42 | 79 | 4 | 47 | 2 | 11 | 1 | 27 | 1 | 164 | 0.07 |
| EO-1 | 12 | 1 | 3 | 1 | 36 | 2 | 12 | 1 | 63 | 0.57 |
| EO-2 | 18 | 1 | 4 | 1 | 34 | 2 | 20 | 1 | 76 | 0.45 |
| EO-3 | 20 | 1 | 8 | 0 | 37 | 2 | 24 | 1 | 89 | 0.42 |
| EO-4 | 13 | 1 | 9 | 0.5 | 43 | 2 | 18 | | 83 | 0.52 |

*Precision is estimated with S/N.

The ethylene α-olefin copolymers were used in TPV. Compositions are shown in Table 5.

TABLE 5

Compositions

| Composition | | Comp. Ex. A | Comp. Ex. B | Ex. 1 | Ex. 2 | Ex. 3 | Ex. 4 | Ex. 5 |
|---|---|---|---|---|---|---|---|---|
| EO 42 | phr | 100 | 100 | | | | | |
| EO-1 | phr | | | 100 | 100 | | | |
| EO-2 | phr | | | | | 100 | | |
| EO-3 | phr | | | | | | 100 | |
| EO-4 | phr | | | | | | | 100 |
| PP H110-02N (2MFR) | phr | 45 | 45 | 45 | 45 | 45 | 45 | 45 |
| HYDROBRITE 550PO | phr | 70 | 70 | 70 | 70 | 70 | 70 | 70 |
| Peroxide (LUPEROX 101-XL45) | phr | 3.00 | | 3.00 | | 3.00 | 3.00 | 3.00 |
| Peroxide (LUPEROX F40M-SP) | phr | | 3.00 | | 3.00 | | | |
| Coagent (TAIC-DLC-72) | phr | 1.88 | 1.88 | 1.88 | 1.88 | 1.88 | 1.88 | 1.88 |
| IRGANOX B225 | phr | 0.25 | 0.25 | 0.25 | 0.25 | 0.25 | 0.25 | 0.25 |
| Total | phr | 220.13 | 220.13 | 220.13 | 220.13 | 220.13 | 220.13 | 220.13 |
| EO 42 | wt % | 45.43 | 45.43 | | | | | |
| EO-1 | wt % | | | 45.43 | 45.43 | | | |
| EO-2 | wt % | | | | | 45.43 | | |
| EO-3 | wt % | | | | | | 45.43 | |
| EO-4 | wt % | | | | | | | 45.43 |
| PP H110-02N (2MFR) | wt % | 20.44 | 20.44 | 20.44 | 20.44 | 20.44 | 20.44 | 20.44 |
| HYDROBRITE 550PO | wt % | 31.80 | 31.80 | 31.80 | 31.80 | 31.80 | 31.80 | 31.80 |
| Peroxide (LUPEROX 101-XL45) | wt % | 1.36 | | 1.36 | | 1.36 | 1.36 | 1.36 |
| Peroxide (LUPEROX F40M-SP) | wt % | | 1.36 | | 1.36 | | | |
| Coagent (TAIC-DLC-72) | wt % | 0.85 | 0.85 | 0.85 | 0.85 | 0.85 | 0.85 | 0.85 |
| IRGANOX B225 | wt % | 0.11 | 0.11 | 0.11 | 0.11 | 0.11 | 0.11 | 0.11 |
| Total | wt % | 100.00 | 100.00 | 100.00 | 100.00 | 100.00 | 100.00 | 100.00 |

02N) were added to a HAAKE mixer bowl, heated to 190° C., and rotating at 35 rpm. The materials were mixed for four minutes at 75 rpm. The cure package (coagent TAIC, followed by peroxide LUPEROX 101-XL45 or LUPEROX F40M-SP) was added to the molten mixture, and the mixing was allowed to continue for three more minutes. The antioxidant was added, and the mixing was allowed to continue for one more minute. The melt was removed from the internal mixer, and allowed to further mix on a 2-roll mill (RELIABLE two roll mill mixer) at 190° C. The melt was passed through the roll mill to form a sheet, and the resulting sheet was rolled into a cigar-shaped specimen before being placed end-wise into a mill, and the "rolled sheet" was passed through the mill. This step was repeated six times, and then the sample was taken off the mill as a final sheet. The final sheet was preheated in a heated press (190° C.) for two minutes, under 2000 psi of pressure. Then the sheet was compression molded at 190° C., under 55000 psi of pressure, for four minutes, and then cooled for four minutes under 55000 psi of pressure. This procedure produced good test plaques without visible cracks. One series of plaques had dimensions in "7 inch×8 inch×1/16 inch" and another series has dimensions "4 inch×6 inch×1/8 inch."

Shore A Hardness

Hardness measurements were taken with a Shore A type durometer. The durometer was placed onto a plaque of approximately 3 mm thickness (1/8 inch), prepared according to the compression molding procedure above.

Compression Set

Compression set was measured according to ASTM D-395 at 70° C. and 120° C. Pucks of diameter of 29 mm(±0.5 mm) were extracted from the compression molded plaques of approximately 3 mm (1/8 inch) thickness. For each sample, four pucks were inspected for notches, uneven thickness and inhomogeneity, and were stacked, such that the total height was 12.5 mm(±0.5 mm), equating to compressive strain of 25%. Compression set was performed on two specimens, for each sample, at the two temperatures.

The stacked pucks were placed in the compressive device, and locked into place; the apparatus was then placed at the appropriate temperature for specified time (22 hrs for 70° C. and 70 hrs for 120° C.). In this test, the stress is released at the test temperature, and the thickness of the sample is measured after a 30 minutes equilibration period, at room temperature. Compression set is a measure of the degree of recovery of a sample following compression, and is calculated according to the equation $CS=(H0-H2)/(H0-H1)$, where H0 is the original thickness of the sample, H1 is the thickness of the spacer bar used, and H2 is the final thickness of the sample after removal of the compressive force.

Stress-Strain Properties

Tensile properties were measured at room temperature following ASTM D-412, on micro-tensile specimens (1/16 inch plaques) that were die cut from the same compression molded plaques in the mill direction. The tensile strain was calculated from the ratio of the increment of the length between clamps to the initial gauge length. The tensile stress was determined from dividing the tensile load by the initial cross section of the sample. Table 6 lists a summary of the above characterization methods used in this study and specific conditions. Properties of the TPVs are summarized in Table 7 below.

TABLE 6

Summary of Characterization Methods and Conditions

| Test and Description | ASTM # | Test Condition |
|---|---|---|
| Shore A Hardness | D2240 | 10 s delay |
| Tensile Properties* | D1708 | Microtensiles--Die 84 |
| Compression Set | D395B | 25% strain, 22 hrs @ 70° C. |
|  |  | 25% strain, 70 hrs @ 120° C. |

TABLE 7

TPV Properties

| Properties | Unit | Comp. Ex. A | Comp. Ex. B | Ex. 1 | Ex. 2 | Ex. 3 | Ex. 4 | Ex. 5 |
|---|---|---|---|---|---|---|---|---|
| Hardness ShA 10 s |  | 56 | 58 | 58 | 58 | 62 | 60 | 50 |
| Compression Set 22 hr @ 70° C. | % | 52 | 50 | 50 | 45 | 43 | 42 | 39 |
| Compression Set 70 hr @ 120° C. | % | 76 | 70 | 67 | 65 | 59 | 64 | 66 |
| 100% Modulus | psi | 272 | 281 | 299 | 292 | 316 | 318 | 216 |
| Tensile Strength | psi | 549 | 665 | 640 | 720 | 716 | 729 | 573 |
| Ult. Elongation | % | 361 | 416 | 365 | 436 | 425 | 421 | 433 |

As shown in Table 7, at similar Shore A hardness, the Inventive Example 1 had a lower "120° C. compression set" as compared to Comparative Example A. The tensile strength and ultimate elongation of Inventive Example 1 were also better (higher) than those of Comparative Example A. Inventive Examples 3, 4 and 5 had better (lower) values of the "70° C. and 120° C. compression sets," and Examples 3 and 4 had improved (higher) the 100% modulus, tensile strength and ultimate elongation, as compared to Comparative Example A. Inventive Examples 2 showed improvement in the compression sets (lower values) as compared to Comparative Example B. At the same Shore A hardness, Inventive Example 2 also showed increased 100% modulus, tensile strength and ultimate elongation, as compared to Comparative Example B. Overall, the inventive compositions have a better balance of compression set, modulus, tensile strength and elongation.

Although the invention has been described in considerable detail in the preceding examples, this detail is for the purpose of illustration, and is not to be construed as a limitation on the invention, as described in the following claims.

The invention claimed is:

1. A composition comprising at least the following:
   A) an ethylene/α-olefin interpolymer;
   B) an olefin-based polymer; and
   C) a crosslinking agent; and
   wherein the ethylene/α-olefin interpolymer of component A) has the following properties:
   i) has a density greater than, or equal to, 0.850 g/cc;
   ii) a molar ratio of "vinyl to total unsaturation" greater than, or equal to, 1/10;
   iii) an I10/I2 ratio from 6.2 to 40.

2. The composition of claim 1, wherein the ethylene/α-olefin interpolymer of component A) is an ethylene/α-olefin copolymer.

3. The composition of claim 1, wherein the ethylene/α-olefin interpolymer has a density from 0.850 to 0.910 g/cc.

4. The composition of claim 1, wherein the olefin-based polymer of component B is a propylene-based polymer.

5. The composition of claim 1, further comprising a coagent.

6. The composition of claim 5, wherein the coagent is a trifunctional acrylate.

7. The composition of claim 5, wherein the molar ratio of crosslinking agent to coagent is from 1 to 1/5.

8. The composition of claim 1, wherein the ethylene/α-olefin interpolymer of component A is present in an amount from 20 to 80 weight percent, based on the sum weight of components A and B.

9. The composition of claim 1, wherein the olefin-based polymer of component B is present in an amount from 20 to 80 weight percent, based on the sum weight of components A and B.

10. The composition of claim 1, wherein Components A and B are present in an amount greater than 80 weight percent, based on the weight of the composition.

11. A crosslinked composition formed from the composition of claim 1.

12. The crosslinked composition of claim 11, wherein the crosslinked composition has a compression set, at 22 hr at 70° C., less than, or equal to, 50%.

13. The crosslinked composition of claim 11, wherein the crosslinked composition has a compression set at, 70 hr at 120° C., less than, or equal to, 67%.

14. An article comprising at least one component formed from the composition of claim 1.

15. The article of claim 14, wherein the article is a door profile, a window profile, a gasket, or a molded part.

* * * * *